(12) United States Patent
Tourapis et al.

(10) Patent No.: US 10,038,916 B2
(45) Date of Patent: Jul. 31, 2018

(54) ENCODING AND DECODING ARCHITECTURES FOR FORMAT COMPATIBLE 3D VIDEO DELIVERY

(71) Applicant: DOLBY LABORATORIES LICENSING CORPORATION, San Francisco, CA (US)

(72) Inventors: Alexandros Tourapis, Los Gatos, CA (US); Peshala V. Pahalawatta, Glendale, CA (US); Athanasios Leontaris, Mountain View, CA (US); Kevin J. Stec, Los Angeles, CA (US); Walter J. Husak, Simi Valley, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 15/675,058

(22) Filed: Aug. 11, 2017

(65) Prior Publication Data
US 2017/0339429 A1    Nov. 23, 2017

Related U.S. Application Data

(63) Continuation of application No. 13/376,707, filed as application No. PCT/US2010/040545 on Jun. 30, 2010, now Pat. No. 9,774,882.
(Continued)

(51) Int. Cl.
*H04N 13/00*    (2018.01)
*H04N 19/59*    (2014.01)
(Continued)

(52) U.S. Cl.
CPC .......... *H04N 19/59* (2014.11); *H04N 19/105* (2014.11); *H04N 19/117* (2014.11);
(Continued)

(58) Field of Classification Search
CPC ...... H04N 19/59; H04N 19/105; H04N 19/85; H04N 19/597; H04N 19/117; H04N 19/33;
(Continued)

(56) References Cited

U.S. PATENT DOCUMENTS 4,985,767 A    1/1991    Haghiri
5,260,773 A    11/1993   Dischert
(Continued)

FOREIGN PATENT DOCUMENTS

EP    1455534    9/2004
EP    1720358    11/2006
(Continued)

OTHER PUBLICATIONS

Hutchison, David, Introducing DLP 3-D TV, Texas Instruments DLP TV pp. 1-5.
(Continued)

*Primary Examiner* — Joseph Ustaris
*Assistant Examiner* — Jill Sechser

(57) ABSTRACT

Encoding and decoding architectures for 3D video delivery are described, such as 2D compatible 3D video delivery and frame compatible 3D video delivery. The architectures include pre-processing stages to pre-process the output of a base layer video encoder and/or decoder and input the pre-processed output into an enhancement layer video encoder and/or decoder of one or more enhancement layers. Multiplexing methods of how to combine the base and enhancement layer videos are also described.

3 Claims, 17 Drawing Sheets

Related U.S. Application Data

(60) Provisional application No. 61/223,027, filed on Jul. 4, 2009.

(51) Int. Cl.
| | | |
|---|---|---|
| *H04N 19/597* | (2014.01) | |
| *H04N 19/105* | (2014.01) | |
| *H04N 19/147* | (2014.01) | |
| *H04N 19/172* | (2014.01) | |
| *H04N 19/61* | (2014.01) | |
| *H04N 19/117* | (2014.01) | |
| *H04N 19/136* | (2014.01) | |
| *H04N 19/17* | (2014.01) | |
| *H04N 19/187* | (2014.01) | |
| *H04N 19/82* | (2014.01) | |
| *H04N 19/33* | (2014.01) | |
| *H04N 19/85* | (2014.01) | |
| *H04N 19/573* | (2014.01) | |

(52) U.S. Cl.
CPC ......... *H04N 19/136* (2014.11); *H04N 19/147* (2014.11); *H04N 19/17* (2014.11); *H04N 19/172* (2014.11); *H04N 19/187* (2014.11); *H04N 19/33* (2014.11); *H04N 19/573* (2014.11); *H04N 19/597* (2014.11); *H04N 19/61* (2014.11); *H04N 19/82* (2014.11); *H04N 19/85* (2014.11)

(58) Field of Classification Search
CPC .. H04N 19/147; H04N 19/187; H04N 19/573; H04N 19/61; H04N 19/17; H04N 19/172; H04N 19/136; H04N 19/82
See application file for complete search history.

(56) References Cited

U.S. PATENT DOCUMENTS

| | | |
|---|---|---|
| 5,621,660 A | 4/1997 | Chaddha |
| 6,173,013 B1 | 1/2001 | Suzuki |
| 6,414,991 B1 | 7/2002 | Yagasaki |
| 7,499,492 B1 | 3/2009 | Ameres |
| 7,876,833 B2 | 1/2011 | Segall |
| 7,881,552 B1 | 2/2011 | Gerber |
| 8,149,910 B2 | 4/2012 | Tanizawa |
| 8,363,724 B2 | 1/2013 | Su |
| 8,373,744 B2 | 2/2013 | Akka |
| 8,487,982 B2 | 7/2013 | Lipton |
| 9,445,116 B2 | 9/2016 | Pandit |
| 2003/0053711 A1 | 3/2003 | Kim |
| 2003/0133500 A1 | 7/2003 | Auwera |
| 2004/0022318 A1 | 2/2004 | Garrido |
| 2005/0185712 A1 | 8/2005 | Lee |
| 2006/0023782 A1 | 2/2006 | Cai |
| 2006/0083308 A1 | 4/2006 | Schwarz |
| 2006/0088101 A1 | 4/2006 | Han |
| 2006/0222079 A1 | 10/2006 | Park |
| 2006/0268991 A1 | 11/2006 | Segall |
| 2007/0053431 A1 | 3/2007 | Cammas |
| 2007/0110155 A1 | 5/2007 | Sung |
| 2007/0140350 A1 | 6/2007 | Sakazume |
| 2007/0140354 A1 | 6/2007 | Sun |
| 2007/0160134 A1 | 7/2007 | Segall |
| 2007/0160300 A1 | 7/2007 | Van Vugt |
| 2007/0223582 A1 | 9/2007 | Borer |
| 2008/0095235 A1 | 4/2008 | Hsiang |
| 2008/0303895 A1 | 12/2008 | Akka |
| 2009/0015662 A1 | 1/2009 | Kim |
| 2009/0097548 A1 | 4/2009 | Karczewicz |
| 2009/0175333 A1 | 7/2009 | Hsiang |
| 2010/0061447 A1 | 3/2010 | Tu |
| 2010/0165077 A1 | 7/2010 | Yin |
| 2010/0260268 A1 | 10/2010 | Cowan |
| 2011/0135005 A1 | 6/2011 | Tourapis |
| 2012/0027079 A1 | 2/2012 | Ye |
| 2012/0075436 A1 | 3/2012 | Chen |
| 2012/0092452 A1 | 4/2012 | Tourapis |
| 2012/0293620 A1 | 11/2012 | Pahalawatta |

FOREIGN PATENT DOCUMENTS

| | | |
|---|---|---|
| JP | 2006-081161 | 3/2006 |
| JP | 2006-295913 | 10/2006 |
| JP | 2007-159111 | 6/2007 |
| WO | 2003/056843 | 7/2003 |
| WO | 2007/047736 | 4/2007 |
| WO | 2007/063808 | 6/2007 |
| WO | 2008/010932 | 1/2008 |
| WO | 2008/133910 | 11/2008 |
| WO | 2010/123855 | 10/2010 |
| WO | 2010/123862 | 10/2010 |
| WO | 2010/123909 | 10/2010 |
| WO | 2011/005625 | 1/2011 |
| WO | 2011/087932 | 7/2011 |

OTHER PUBLICATIONS

ITU-T Telecommunication Standardization Sector of ITU, "Advanced Video Coding for Generic Audiovisual Services", May 2003, H264, Series H: Audiovisual and Multimedia Systems Infrastructure of Audiovisual Services—Coding of Moving Video.
JVT Reference Software Version JM16.0.
McCormick, et al., "Implementation of Stereoscopic and Dualview Images on a Micro-Display High Definition Television", 3DTV-Con08, May 28-30, 2008, Istanbul Turkey, pp. 33-36.
Schwarz, et al., "Overview of the Scalable Extension of the H.264/MPEG-4 AVC Video Coding Standard" Oct. 2006.
SMPTE 421M "VC-1 Compressed Video Bitstream Format and Decoding Process", Apr. 2006.
Tourapis, et al., "Format Extensions to the Spatially Interleaved Pictures SEI Message" 30th JVT Meeting Jan. 29-Feb. 3, 2009, Joint Video Team of ISO/IEC MPEG.
Chan et al., "Mathematical models for local nontexture inpaintings" SIAM Journal of Applied Mathematics, vol. 62 No. 3, pp. 1019-1043, 2002.
Eskicioglu A.M. et al., "Image Quality Measures and their performance", IEEE Transactions on Image processing, vol. 12, pp. 2959-2965, Dec. 1, 1995.
Guleryuz, "Weighted Averaging for Denoising with Overcomplete Dictionaries", IEEE Transactions on Image processing, vol. 16, No. 12, pp. 3020-3034, 2007.
Kimata H. et al., "Inter-View Prediction with Downsampled Reference Pictures", ITU Study Group 16-Video Coding Experts Group-ISO/IEC MPEG & ITU-T VCEG (ISO/IEC JTC1/SC29/WG11 and ITU-T SG16 06), No. JVT-W079, 12 pages, Apr. 19, 2007.
Li et al., "Wavelet Compression of Multiview video with Disparity Compensated Lifting", Signal Processing and Information Technology, 2007 IEEE International Symposium on, IEEE, Piscataway NJ USA, pp. 952-955, Dec. 15, 2007.
Mallat et al., "A review of bandlet methods for geometrical image representation", Numerical Algorithms, pp. 1-25, Apr. 1, 2007.
Ohm, "Advances in Scalable Video Coding", Proc. of the IEEE, vol. 93, No. 1, pp. 42-56 Abstract only, Jan. 1, 2005.
Rusanovskyy et al., "Adaptive Interpolation with Directional Filters", ITU-T SGI 6/q.6 Doc. VCEG-AG21, Shenzhen China, 4 pages, Oct. 2007.
Stelmach L.B. et al., "Stereo Image Quality: Effects of Mixed Spatio-Temporal Resolution", IEEE Transactions on Circuits and Systems for Video Technology, vol. 10 pp. 188-193, 2000.
Tam W.J., "Image and Depth Quality of Asymmetrically Coded Stereoscopic Video for 3D-TV", JVT Meeting of ISO/IEC JTC1 and ITU-T-SG 16, 8 pages, Apr. 19, 2007.
Tourapis et al., "Fast motion estimation within the H.264 codec", Proceedings of the International Conference on Multimedia and Expo, vol. 3, pp. 517-520, 2003.

(56) References Cited

OTHER PUBLICATIONS

Tourapis A.M. et al., "A Frame Compatible System for 3D Delivery", MPEG meeting ISO/IEC JTC1/SC29/WG11, 9 pages, Jul. 30, 2010.
Vatis et al., "Two Dimensional non-separable adaptive Wiener interpolation filter for H.264/AVC", ITU-T SGI 6/Q.6 Doc. VCEG-Z17, Busan Korea, 5 pages, Apr. 2005.
Vatis Y. et al., "Comparison of Complexity between Two-dimensional non-separable Adaptive Interpolation Filter and Standard Wiener Filter", ITU-Telecommunications Standardization Sector Study Group 16, Question 6, Video Coding Experts Group (VCEG) 28th Meeting Nice FR, 4 pages, Apr. 16-22, 2005.
Winkler S. et al., "The Evolution of Video Quality Measurement: From PSNR to Hybrid Metrics", IEEE Transactions on Broadcasting, vol. 54 No. 3, pp. 660-668, Sep. 1, 2008.
Wittmann et al., "Separable Adaptive Interpolation Filter for Video Coding", Proc. ICIP 2008, IEEE International Conference on Image Processing, San Diego CA, Abstract Only, Oct. 2008.
Ye et al., "Buffered Adaptive Interpolation Filters", IEEE International Conference on Multimedia and Expo, pp. 376-381, Jul. 19, 2010.

ENCODING AND DECODING ARCHITECTURES FOR FORMAT COMPATIBLE 3D VIDEO DELIVERY

CROSS REFERENCE TO RELATED APPLICATIONS

The present application is a continuation of U.S. patent application Ser. No. 13/376,707, filed on Dec. 7, 2011, which is the national phase stage of International Patent Application No. PCT/US2010/040545, filed on Jun. 30, 2010, which claims the benefit of priority to U.S. Provisional Application No. 61/223,027, filed on Jul. 4, 2009, each of which is incorporated herewith by reference in its entirety.

FIELD

This disclosure relates to image processing and video compression. More particularly, embodiments of the present disclosure relate to encoding and decoding systems and methods for 3D video delivery, such as 2D compatible and frame compatible 3D video delivery.

BACKGROUND

The provision of a stereoscopic (3D) user experience is a long held goal of both content providers and display manufacturers. Recently, the urgency of providing a stereoscopic experience to home users has increased with the production and tentative release of multiple 3D movies or other 3D material (e.g., concerts or documentaries).

To ensure rapid adoption among consumers, the ideal solutions should be those that can be implemented with minimal or no alteration to existing playback devices such as set-top boxes, DVD, and Blu-ray disc players, as well as existing 3D capable displays, such as digital light processing (DLP) displays by Samsung and Mitsubishi, some Plasma displays, and polarized based and frame sequential LCD displays.

One possible method for the delivery of 3D content that has these properties is the consideration of creating, coding, and delivering 3D video content by multiplexing the two views into a single frame configuration using a variety of filtering, sampling, and arrangement methods. Sampling could, for example, be horizontal, vertical, or quincunx, while an offset, e.g. a sampling offset, could also be considered between the two views allowing better exploitation of redundancies that may exist between the two views.

Similarly, arrangements could include side by side, over-under, line-interleaved, and checkerboard packing among others, as shown in FIGS. 1-6. Unfortunately, these methods do not provision for the delivery of full resolution stereoscopic material, which can impact quality and experience, and essentially can be an issue for many applications.

The desire for full resolution has lead to some systems that utilize two separate and independent bitstreams, each one representing a different view, like the simulcast 3D video delivery architecture shown in FIG. 8. Unfortunately, the complexity of this method, its bandwidth requirements, i.e. redundancies between the two views are not exploited, but also the fact that this method is not backwards compatible with legacy devices and can have considerable implications to the entire delivery system, has not lead to its adoption.

An extension of this method, that tries to exploit some of the redundancies that may exist between the two views was proposed and adopted as a profile of the Multiview Video Coding (MVC) extension of the MPEG-4 AVC/H.264 video coding standard, i.e. the Stereo High profile, that provisions for the encoding and delivery of stereoscopic material. An example of the MVC based 3D video delivery architecture is shown in FIG. 9. Redundancies are exploited using only translational motion compensation based methods, while the system is based on "intelligent" reference buffer management, i.e. in which order references from the base or enhancement layers are added in the enhancement layer buffer and considered for prediction, for performing prediction compared to the original design of MPEG-4 AVC. Unfortunately, even though coding efficiency was somewhat improved (i.e., 20-30% over simulcast), complexity issues, incompatibility with legacy devices (only 2D support is provided), and the not so significant performance benefits presented using such method still make it as a somewhat unattractive solution.

BRIEF DESCRIPTION OF THE DRAWINGS

The accompanying drawings, which are incorporated into and constitute a part of this specification, illustrate one or more embodiments of the present disclosure and, together with the description of example embodiments, serve to explain the principles and implementations of the disclosure.

DESCRIPTION OF EXAMPLE EMBODIMENTS

Overview

Figure 1:
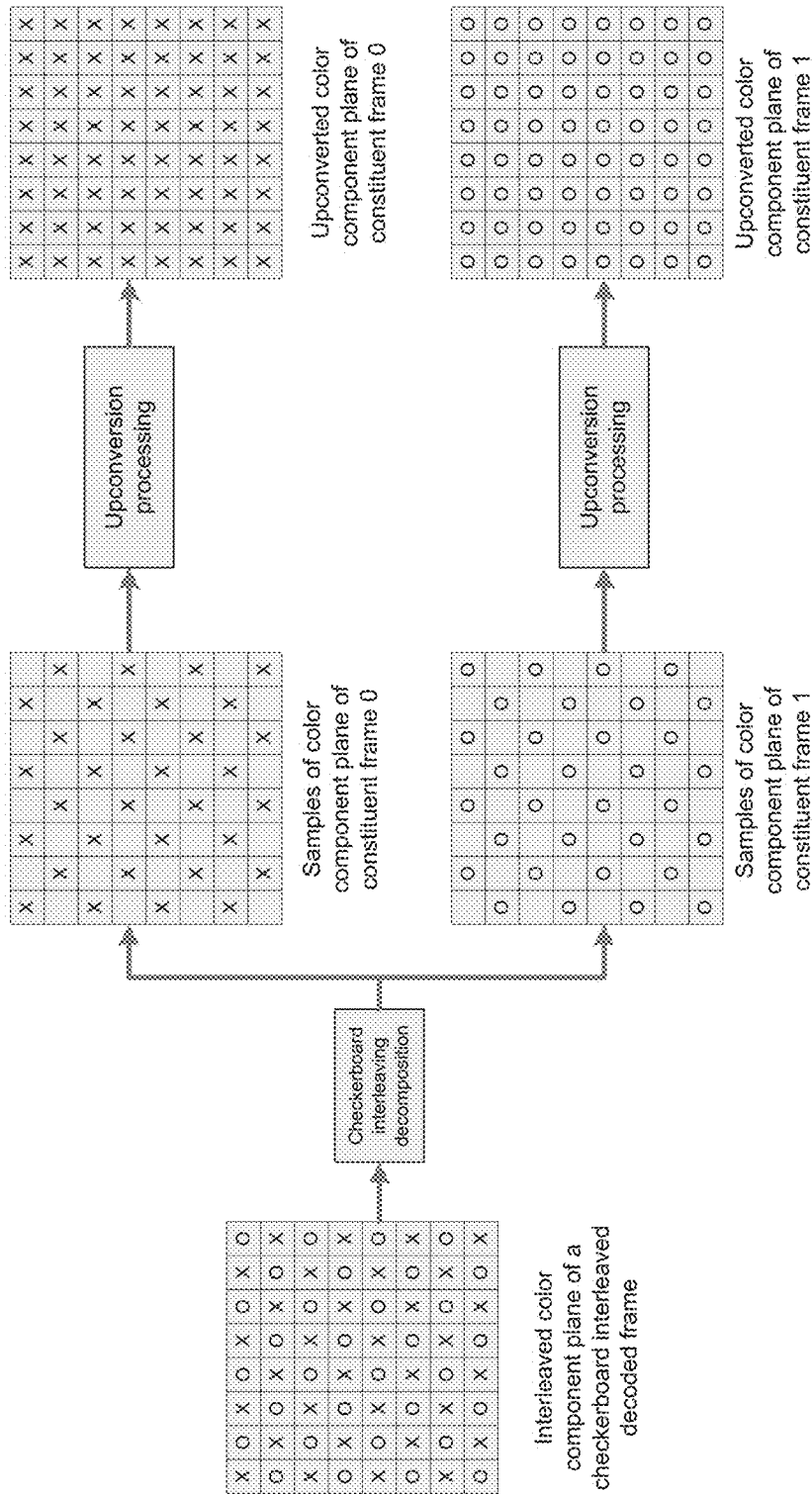
FIG. 1 shows a checkerboard interleaved arrangement for the delivery of stereoscopic material.
Figure 2:
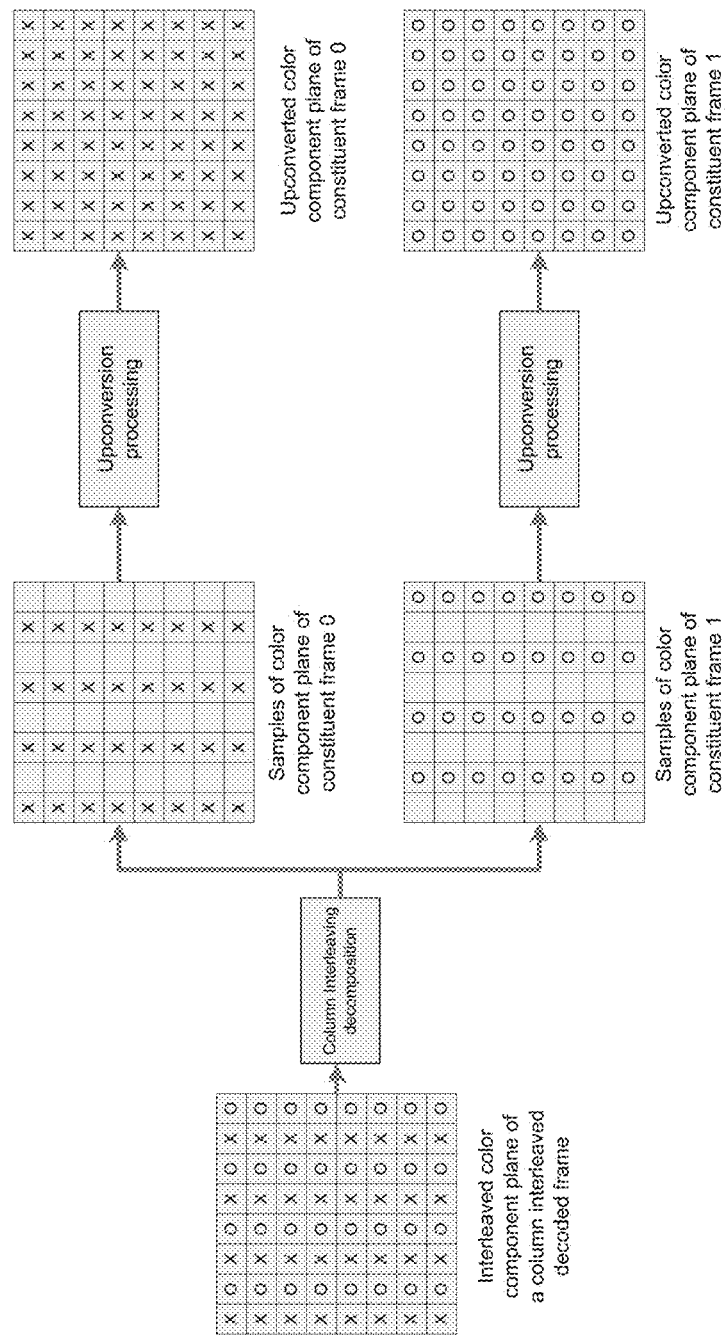
FIG. 2 shows a horizontal sampling/column interleaved arrangement for the delivery of stereoscopic material.

Embodiments of the present disclosure relate to image processing and video compression.

According to a first embodiment, a two-dimensional (2D) compatible or frame compatible three-dimensional (3D) video encoding system is provided, comprising: a base layer, comprising a base layer video encoder; at least one enhancement layer, associated with the base layer, the enhancement layer comprising an enhancement layer video encoder; and at least one pre-processing module, i) to pre-process the output of the base layer video encoder and input the pre-processed output into the enhancement layer video encoder and/or ii) to pre-process the output of one enhancement layer video encoder of one enhancement layer and input the pre-processed output into another enhancement layer video encoder of another enhancement layer.

According to a second embodiment, a two-dimensional (2D) compatible or frame compatible three-dimensional (3D) video decoding system is provided, comprising: a base layer, comprising a base layer video decoder; at least one enhancement layer, associated with the base layer, the enhancement layer comprising an enhancement layer video decoder; and at least one pre-processing module, i) to pre-process the output of the base layer video decoder and input the pre-processed output into the enhancement layer video decoder and/or ii) to pre-process the output of one enhancement layer video decoder of one enhancement layer and input the pre-processed output into another enhancement layer video decoder of another enhancement layer.

According to a third embodiment, a two-dimensional (2D) compatible or frame compatible three-dimensional (3D) video system is provided, comprising: a base layer, comprising a base layer video encoder and a base layer video decoder; at least one enhancement layer, associated with the base layer, the enhancement layer comprising an enhancement layer video encoder and an enhancement layer video decoder; at least one encoder pre-processing module, i) to pre-process the output of the base layer video encoder and input the pre-processed output into the enhancement layer video encoder and/or ii) to pre-process the output of one enhancement layer video encoder of one enhancement layer and input the pre-processed output into another enhancement layer video encoder of another enhancement layer; and at least one decoder pre-processing module, i) to pre-process the output of the base layer video decoder and input the pre-processed output into the enhancement layer video decoder and/or ii) to pre-process the output of one enhancement layer video decoder of one enhancement layer and input the pre-processed output into another enhancement layer video decoder of another enhancement layer.

According to a fourth embodiment, a frame compatible three-dimensional (3D) video encoding system is provided, comprising: a base layer, comprising a base layer video encoder and a base layer multiplexer, the base layer multiplexer receiving an input indicative of a plurality of views and forming a multiplexed output connected with the base layer video encoder; and at least one enhancement layer, associated with the base layer, the at least one enhancement layer comprising an enhancement layer video encoder and an enhancement layer multiplexer, the enhancement layer multiplexer receiving an input indicative of the plurality of views and forming a multiplexed output connected with the enhancement layer video encoder, wherein the base layer video encoder is directly connected with the enhancement layer video encoder.

According to a fifth embodiment, a two-dimensional (2D) compatible or frame compatible three-dimensional (3D) video encoding method is provided, comprising: base layer video encoding a plurality of images or frames; enhancement layer video encoding the plurality of images or frames; pre-processing base layer video encoded images or frames; and adopting the pre-processed base layer video encoded images or frame for the enhancement layer video encoding.

According to a sixth embodiment, a two-dimensional (2D) compatible or frame compatible three-dimensional (3D) video decoding method is provided, comprising: base layer video decoding a plurality of images or frames; pre-processing base layer video decoded images or frames; adopting the pre-processed base layer video decoded images or frames for enhancement layer video decoding; and enhancement layer video decoding the plurality of images or frames;

According to a seventh embodiment, a two-dimensional (2D) compatible or frame compatible three-dimensional (3D) video method is provided, comprising: base layer video encoding a plurality of images or frames; enhancement layer video encoding the plurality of images or frames; pre-processing base layer video encoded images or frames; adopting the pre-processed base layer video encoded images or frame for the enhancement layer video encoding; base layer video decoding a plurality of images or frames; pre-processing base layer video decoded images or frames; adopting the pre-processed base layer video decoded images or frames for enhancement layer video decoding; and enhancement layer video decoding the plurality of images or frames;

According to an eighth embodiment, an encoder for encoding a video signal according to the method of the fifth embodiment is provided.

According to a ninth embodiment, an apparatus for encoding a video signal according to the method of the fifth embodiment is provided.

According to a tenth embodiment, a system for encoding a video signal according to the method of the fifth embodiment is provided.

According to an eleventh embodiment, a decoder for decoding a video signal according to the method of the sixth embodiment is provided.

According to a twelfth embodiment, an apparatus for decoding a video signal according to the method of the sixth embodiment is provided.

According to a thirteenth embodiment, a system for decoding a video signal according to the method of the sixth embodiment is provided.

According to a fourteenth embodiment, a computer-readable medium containing a set of instructions that causes a computer to perform the method or methods recited above is provided.

Embodiments of the present disclosure will show techniques that enable frame compatible 3D video systems to achieve full resolution 3D delivery, without any of the drawbacks of the 2D compatible 3D delivery methods (e.g., MVC). Furthermore, decoder complexity, in terms of hardware cost, memory, and operations required will also be considered. Furthermore, improvements over the existing 2D compatible 3D delivery methods are also shown.

1. 2D Compatible 3D Delivery

Figure 9:
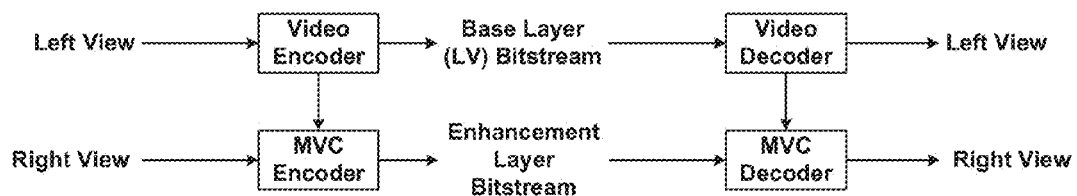
FIG. 9 shows an MVC based 3D video delivery architecture.

Applicants have observed that the MVC extension of the MPEG-4 AVC/H.264 standard constrains prediction between the base and enhancement layers (see FIG. 9) to only utilize translational block based methods, which also include the optional consideration of illumination compensation methods, i.e. weighted prediction.

Figure 10:
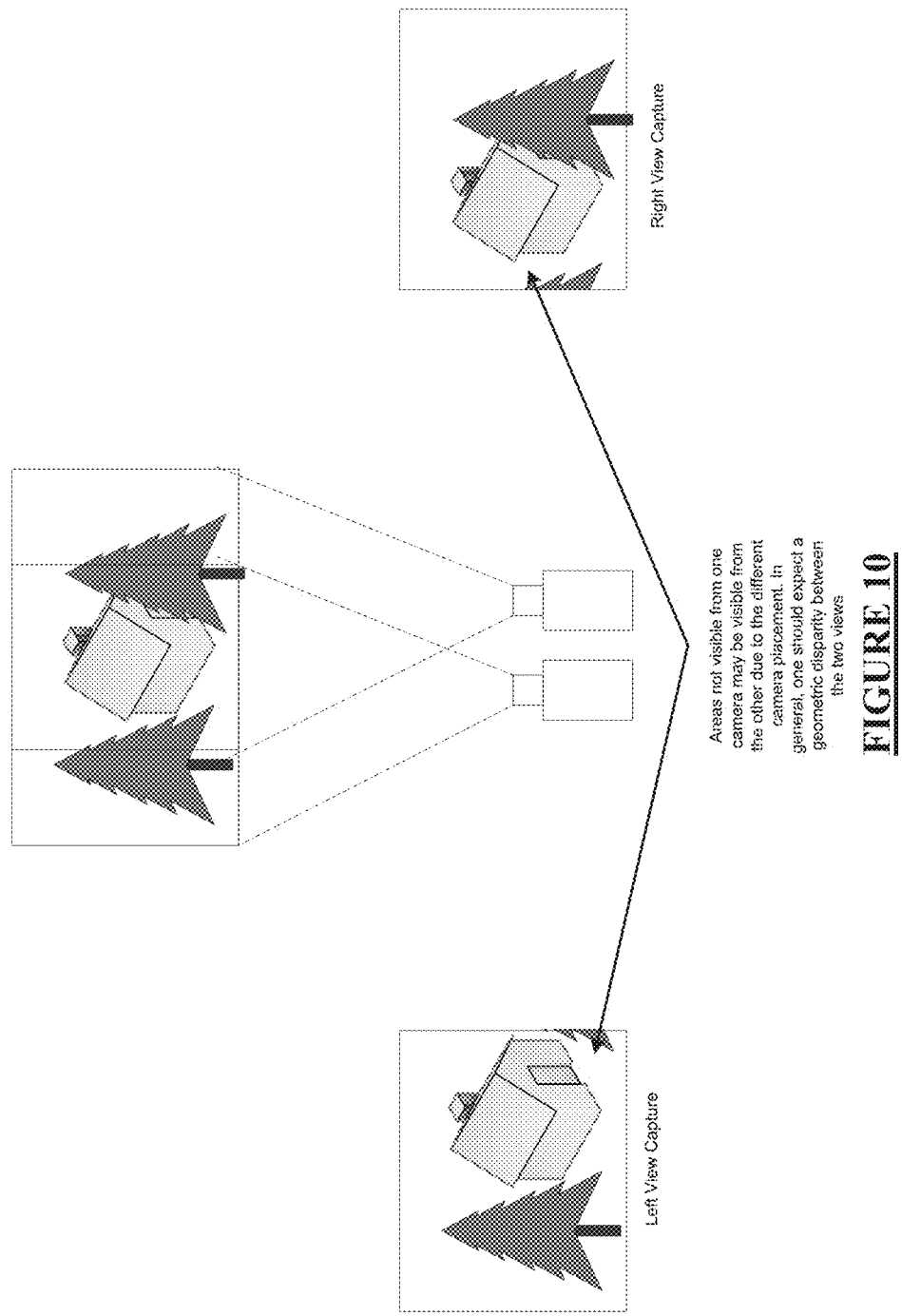
FIG. 10 shows an example of 3D capture.

This can severely affect coding performance since correlation between the two layers is not fully exploited. In general, especially for the scenario of stereo, i.e. left and right view, coding, the two stereo views are characterized more by an affine/geometric "motion" relationship due to the placement of the two cameras used to capture or generate (e.g., in the scenario of a computer generated 3D video sequence) the 3D content, which cannot be captured well using translational (vertical and horizontal only) motion compensation mechanisms. This is also true for the multi-view case, where more than two views for a scene are available. Reference is made to the example shown in FIG. 10.

The content may also have differences in focus or illumination because of the camera characteristics, which again make prediction less accurate. Furthermore, the MVC specification only accounts for 2D compatible 3D video coding systems and has no provision for frame compatible arrangements such as those shown in FIG. 7 of the present application.

To provide a solution to the first problem, i.e. inaccurate prediction from the base to the enhancement layer, a pre-processing stage is introduced between the base and enhancement layer encoders and decoders in accordance with an embodiment of the present disclosure to process or refine the first encoded view for prediction before encoding the second view. In particular, in accordance with such embodiment, data from the base layer are pre-processed and altered using some additional parameters that have been signaled in the bitstream. The pictures thus generated can be available for prediction, if desired. Such process can be used globally or regionally and is not limited to a block-based process.

Figure 12:
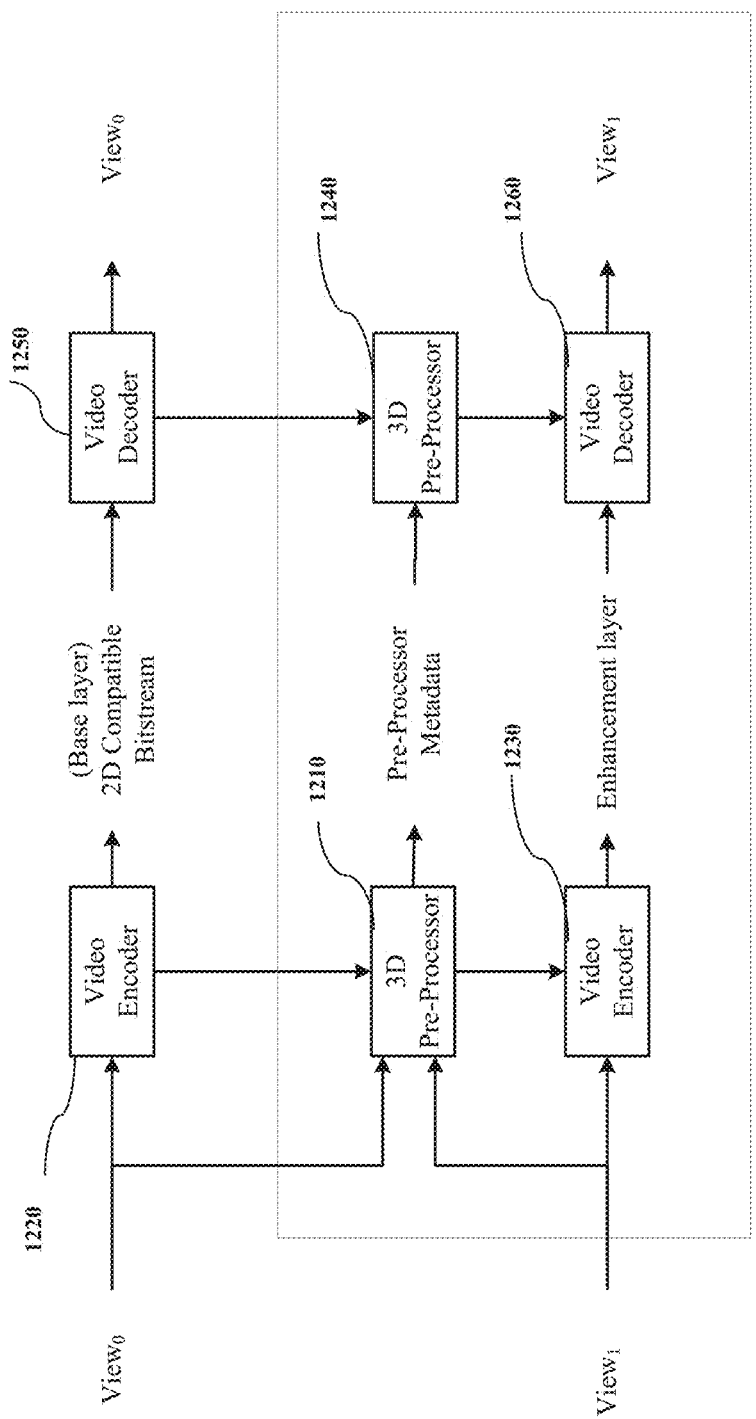
FIG. 12 shows pre-processing stages located between the base layer and the enhancement layer of the video encoder, and the base layer and the enhancement layer of the video decoder of a 2D compatible 3D architecture, in accordance with the present disclosure.

Reference can be made, for example to FIG. 12, where a 3D pre-processor (1210) is shown on the encoding side between base layer video encoder (1220) and enhancement layer video encoder (1230), and a 3D-pre-processor (1240) is shown on the decoding side between base layer video decoder (1250) and enhancement layer video decoder (1260).

The role of this pre-processing stage is to process and adjust the characteristics of the base layer video to better match those of the enhancement layer video. This can be done, for example, by considering pre-processing mechanisms such as filtering (e.g., a sharpening or a low pass filter) or even other more sophisticated methods such as global/region motion compensation/texture mapping.

These methods require the derivation of parameters appropriate for each of them, such as i) the filters, ii) the filter coefficients/length that should be used, and/or iii) the global motion compensation correction parameters that should be applied to the image to generate the new prediction.

A set of parameters could be derived for the entire video, scene, or image. However, multiple parameters could also be used within an image. Parameters, in this scenario, could be assigned for different regions of an image. The number, shape, and size of the regions could be fixed or could also be adaptive. Adaptive regions could be derived given pre-analysis of the content (e.g., a segmentation method), and/or could be user-specified, in which case signaling of the characteristics of the regions (e.g., shape and size) can be signaled within the bitstream.

As an example, a system may signal that each frame is split in N×M rectangular regions, or could signal explicitly the shape of each region using a map description. Determination and signaling of such information could follow the description presented in U.S. Provisional Application 61/170,995 filed on Apr. 20, 2009, for "Directed Interpolation and Data Post-Processing", which is incorporated herein by reference in its entirety.

Figure 3:
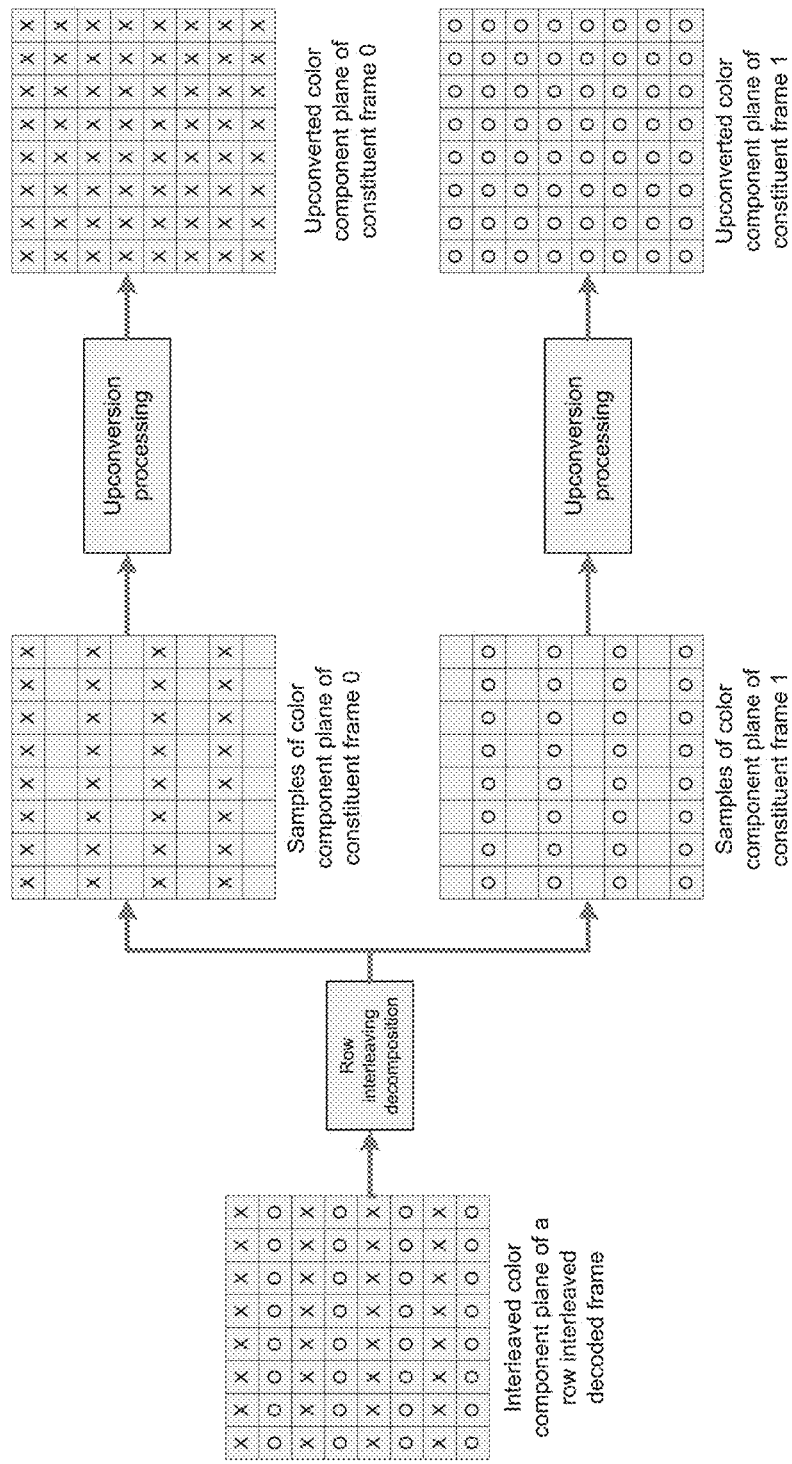
FIG. 3 shows a vertical sampling/row interleaved arrangement for the delivery of stereoscopic material.
Figure 4:
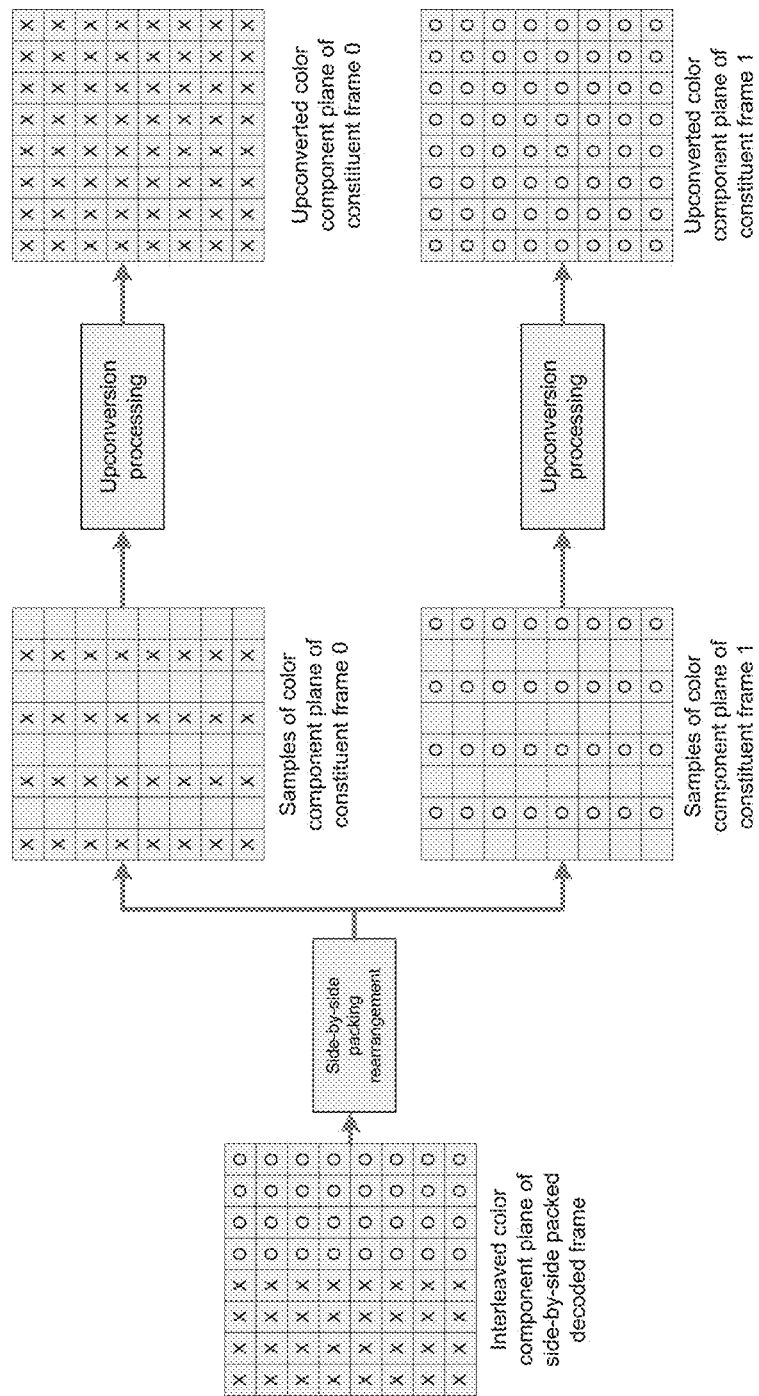
FIG. 4 shows a horizontal sampling/side by side arrangement for the delivery of stereoscopic material.
Figure 5:
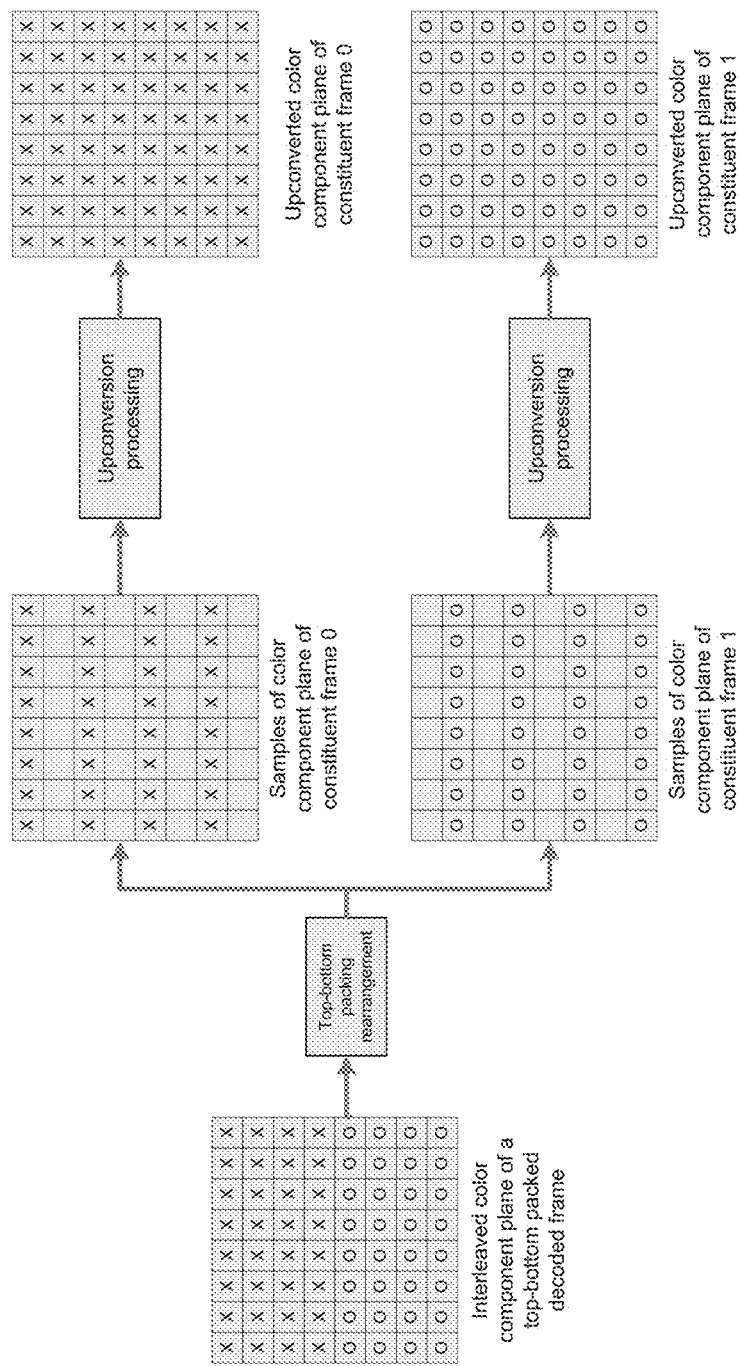
FIG. 5 shows a vertical sampling/over-under arrangement for the delivery of stereoscopic material.
Figure 6:
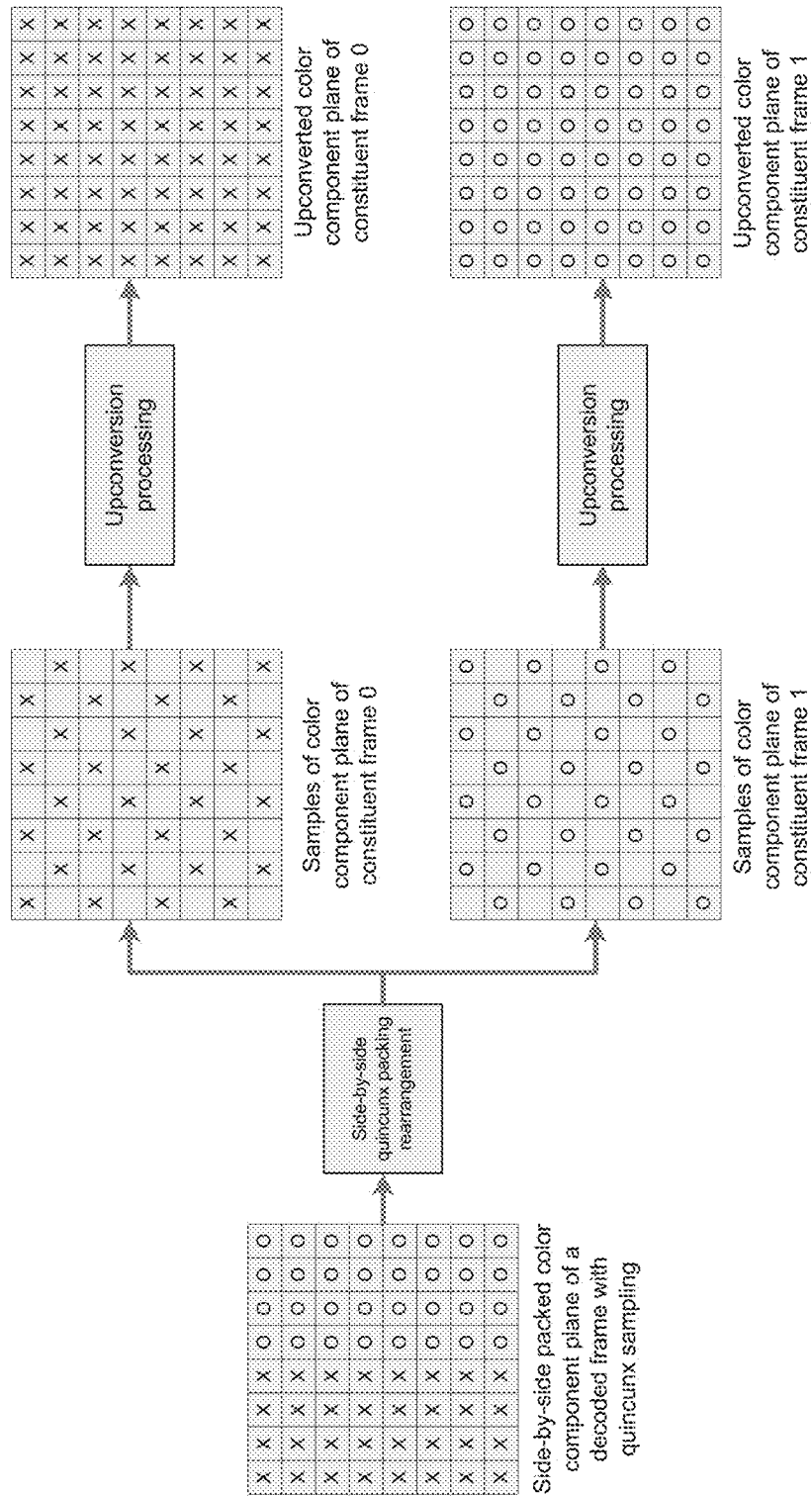
FIG. 6 shows a quincunx sampling/side by side arrangement for the delivery of stereoscopic material.

According to one embodiment, an encoder can evaluate all or a subset of possible pre-processing methods that could be used by the system, by comparing the output of each method compared to the predicted signal (enhancement layer). The method resulting in best performance, e.g. best in terms of complexity, quality, resulting coding efficiency, among others, or a combination of all of these parameters using methods such as Lagrangian optimization, can be selected at the encoder. Reference can be made, for example to FIGS. 3 to 5 of the above mentioned U.S. Provisional 61/170,995, incorporated herein by reference in its entirety.

Figure 17:
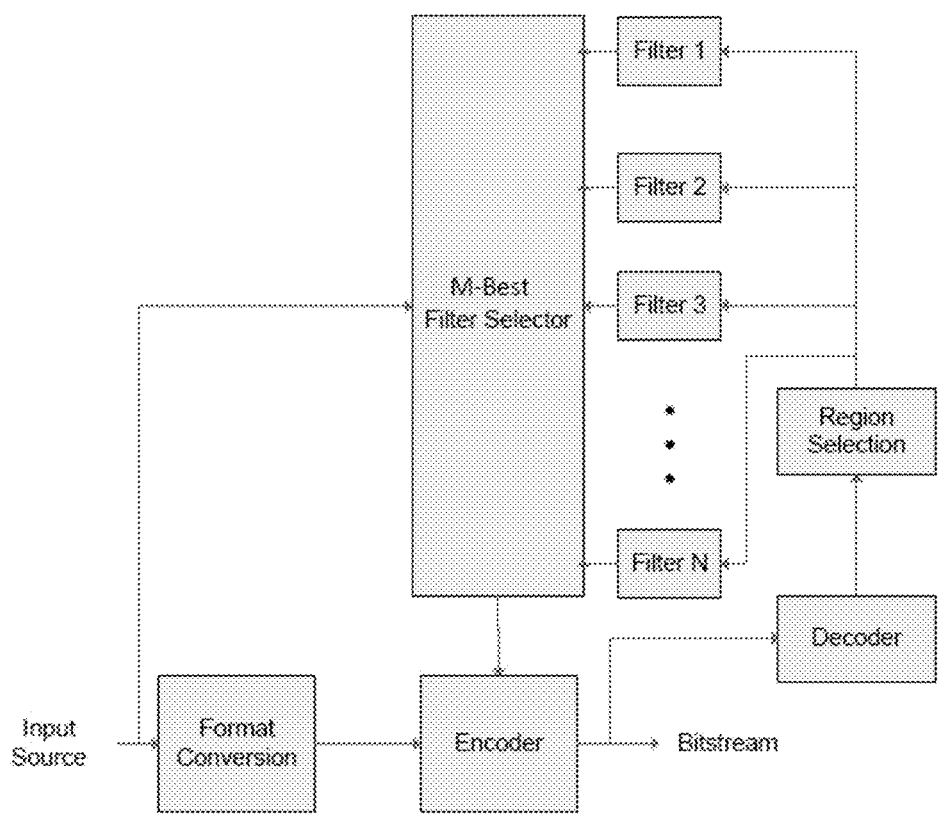
FIG. 17 and FIG. 18 show examples of pre-processing stages according to the present disclosure.
Figure 18:
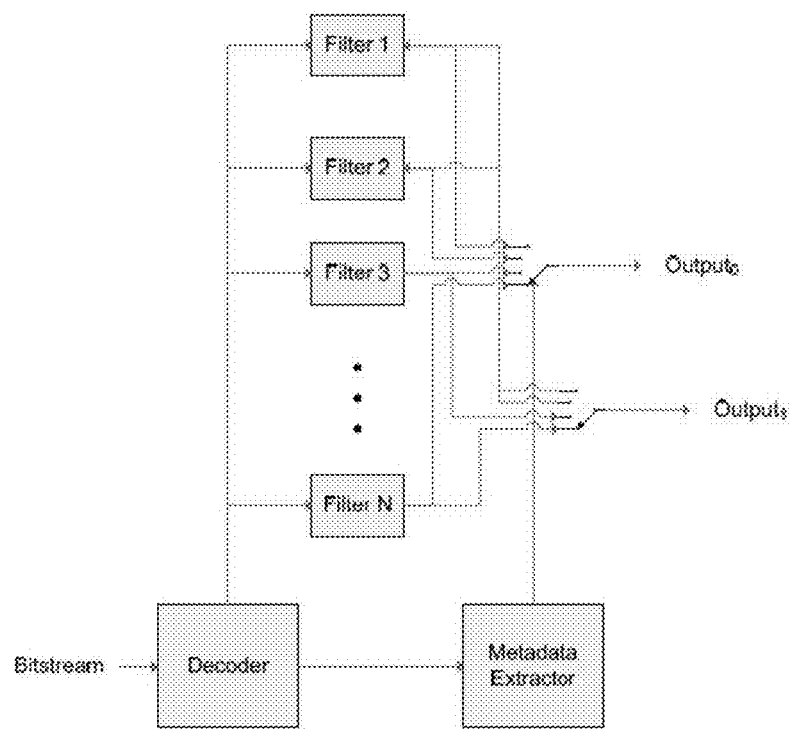

According to another embodiment, multiple parameters that correspond to the same region in the image could also be signaled to generate multiple different potential predictions for the enhancement layer. Reference can be made, for example, to FIG. 17 and FIG. 18 of the present disclosure. FIG. 17 shows a pre-processing system with N filter consideration/signaling. Multiple filters can be selected for a single region by selecting the M best filters that provide the best desired performance which can be defined as quality, cost, enhancement layer coding performance, etc. FIG. 18 shows pre-processing with multi-parameter consideration.

Figure 13:
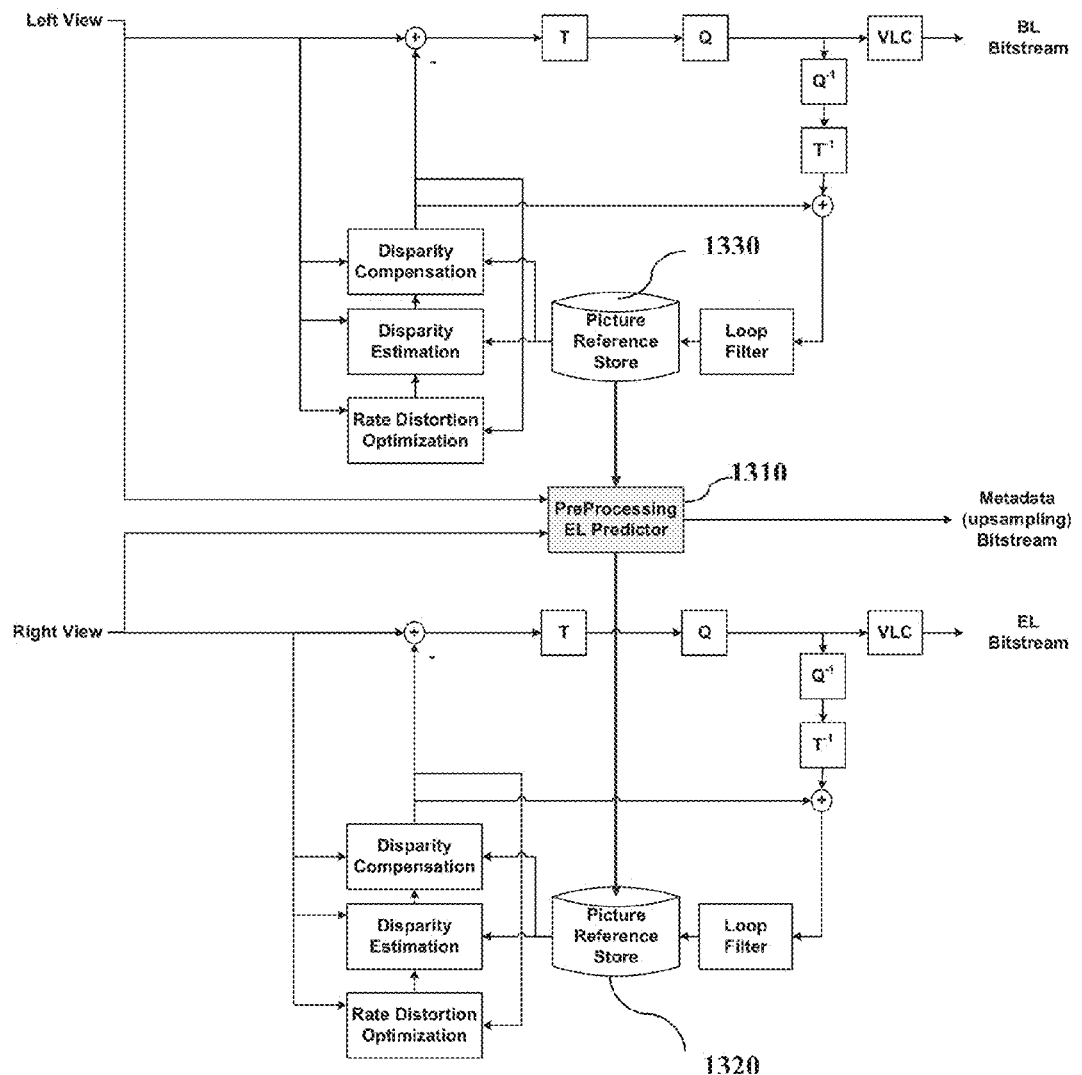
FIG. 13 shows a more detailed diagram of the pre-processing stage of FIG. 12 on the encoder side.

Similarly to MVC, where the base layer is added in the reference buffer of the enhancement layer for prediction purposes (see FIG. 9), the new processed images, e.g., after filtering or global motion compensation correction, are also added in the reference buffer of the enhancement layer, as shown in FIG. 13, where the output of pre-processor (1310) is connected to the reference buffer (1320) of the enhancement layer. According to some embodiments of the present disclosure, the reference buffer (1320) may already include other references such as previously encoded and decoded pictures from the enhancement layer or even pictures generated from processing previously encoded and decoded base layer pictures.

As noted above, for every previously decoded base layer picture, one or more new processed reference pictures can be generated and added in the enhancement layer buffer (1330) as additional reference pictures. All of these references could be considered for prediction using motion compensation methods and mechanisms such as the reference index concept/signaling that is available within codecs such as MPEG-4 AVC (Advanced Video Coding). For example, assuming that a base layer picture has been processed to generate two different reference picture instances, $ref_{b0}$ and $ref_{b1}$, and also $ref_e$, which corresponds to the previously encoded enhancement layer picture, is available as a reference, one can assign reference indices (ref_idx) 0, 1, and 2 to these pictures respectively. If a macroblock in the current enhancement layer picture selects $ref_{b0}$ then ref_idx=0 is signaled in the bitstream. Similarly, ref_idx 1 or 2 are signaled for MBs selecting $ref_{b1}$ and $ref_e$ respectively.

The availability of such processed reference pictures in the enhancement layer buffer involves the consideration of i) appropriate memory management and ii) reference ordering operations in both the encoder and the decoder as is also done in MPEG-4 AVC and its SVC and MVC extensions.

Memory management operations take into consideration which references are removed or added in the reference buffer for prediction, while reference ordering takes into consideration the order of how references are considered for motion compensation, which itself affects the number of bits that will be used when signaling that reference.

Default memory management and reference ordering operations could be considered based on the systems expectation of which is likely to be the least useful (for memory management) or most correlated reference (for reference ordering). As an example, a first-in first-out (FIFO) approach could be considered for memory management, while also both base and enhancement layer pictures corresponding to the same time instance are removed at the same time. On the other hand, base layer information from previous pictures need not be retained after it was used, therefore saving memory. Alternative or additional memory management techniques can include adaptive memory management control.

Similarly, for default ordering, the base layer reference that corresponds to the current time as the current enhancement layer to be encoded could be placed in the beginning of the reference list for prediction, while the rest of the references can be ordered according to temporal distance, coding order, and/or layer relationships. For example, and assuming a single processed reference from the base layer, a default reference order can be as follows:

a) place processed base layer reference, if available, as first reference in list (ref_idx=0)
b) proceed with alternating order and add enhancement layer and previously processed base layer reference pictures in reference buffer according to their temporal distance. If two pictures have the same temporal direction, then determine order according to direction of reference (past or future compared to current picture). If picture/slice type allows one list, then past pictures take precedence over future, while if picture/slice type allows two lists, then for the first list past pictures take precedence over future, while for the second list future pictures take precedence over past.

When multiple references from the base layer are available the default order can also be affected, for example, by the order these references are specified in the bitstream.

The above rules could be specified by the system. The person skilled in the art will also understand that such operations can apply to multiple reference lists, such as in the case of the two prediction lists available in B slices of MPEG-4 AVC/H.264. Explicit memory management and reference ordering operations could also be utilized, which allow further flexibility to be added to the system, since the system can select a different mechanism for handling references for an instance, given reasons such as coding performance and error resiliency among others. In particular, alternatively or in addition to a default ordering, users may wish to specify their own ordering mechanism and use reordering instructions that are signaled in the bitstream, similarly to what is available already in MPEG-4 AVC, that specify exactly how each reference is placed in each reference list.

2. Frame Compatible 3D Delivery

Figure 7:
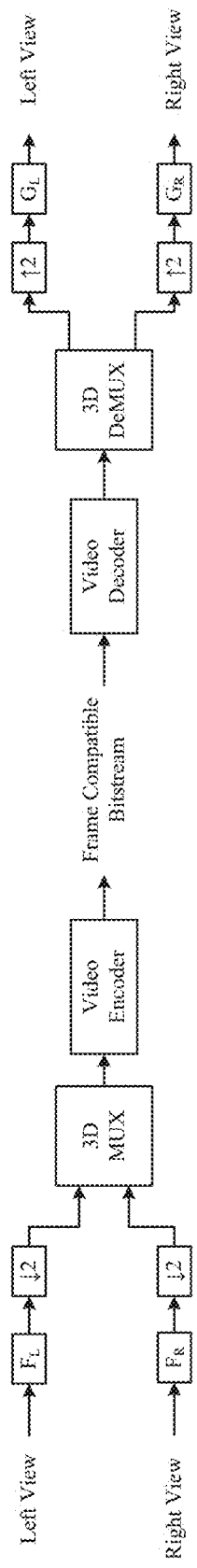
FIG. 7 shows a frame compatible 3D video delivery architecture.
Figure 8:
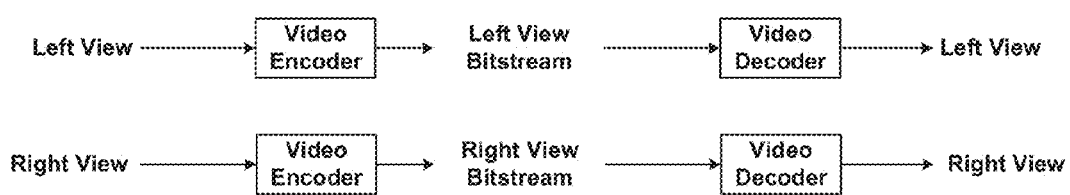
FIG. 8 shows a simulcast 3D video delivery architecture.

The above approach can be extended to frame compatible 3D delivery, generally shown in FIG. 7 of the present application. In this scenario, instead of having a base layer that corresponds to a single view, the base layer now corresponds to two views that have been previously subsampled using a variety of methods and multiplexed using a variety of arrangements. As mentioned earlier, subsampling could include horizontal, vertical, or quincunx among others, and multiplexing could include side by side, over-under, line or column interleaved, and checkerboard among others.

Figure 11:
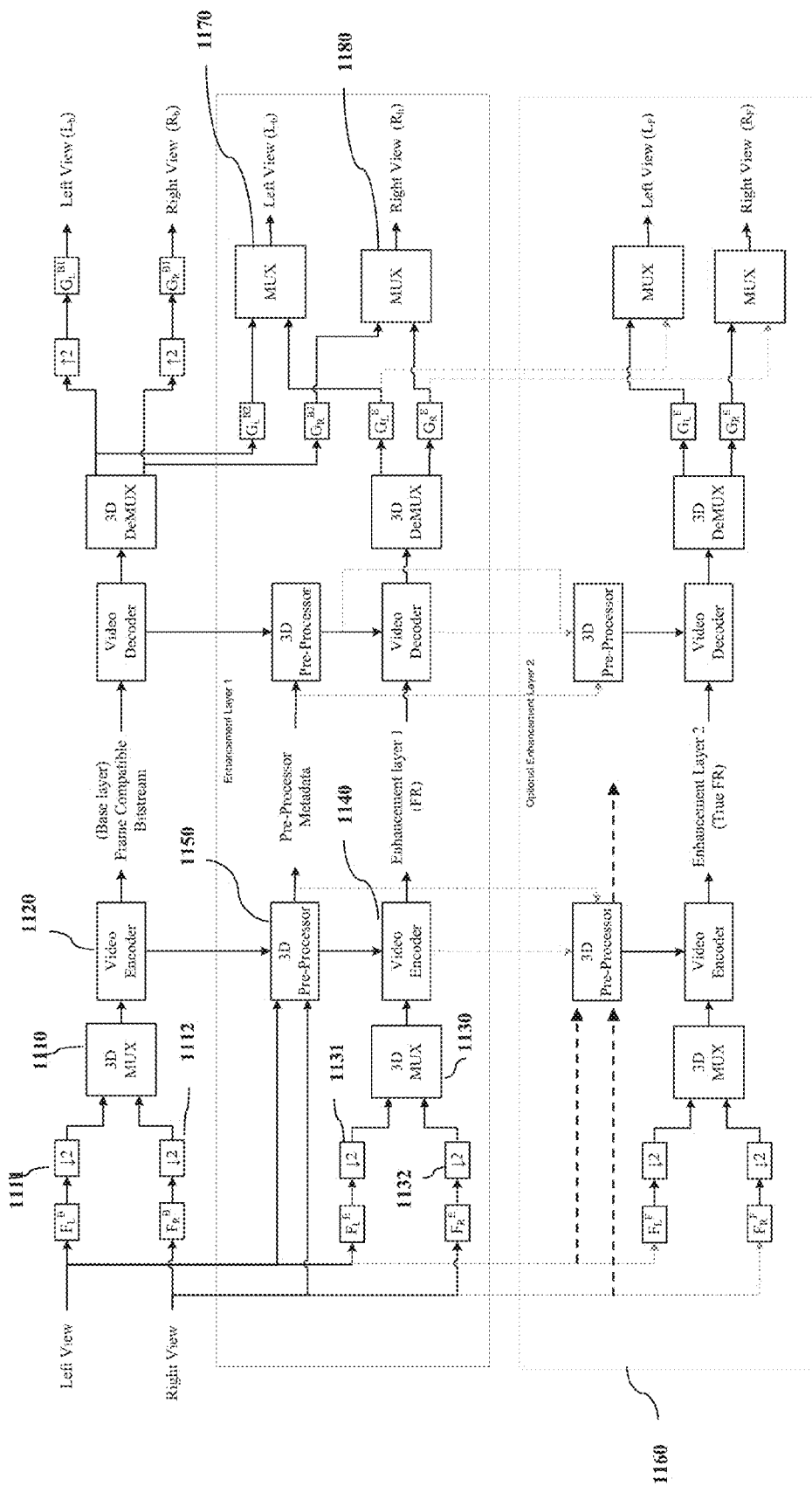
FIG. 11 shows pre-processing stages located between a base layer and an enhancement layer, and between a first enhancement layer and a second enhancement layer of a frame compatible 3D architecture.

Reference can be made, for example, to the embodiment of FIG. 11, where a base layer 3D multiplexer (1110) connected with a base layer video encoder (1120) and an enhancement layer 3D multiplexer (1130) connected with an enhancement layer video encoder (1140) are shown.

In this scenario, instead of missing information for one of the two views, what are essentially missing are resolution and/or high frequency information for both views. Therefore, what is desired by such system is the ability, if desired, to add back the missing information to the signal.

In the simplest embodiment of such a system, subsampling can be performed using basic pixel decimation (1111), (1112), (1131), (1132), i.e. without necessarily the consideration of any filtering, where the base layer corresponds to one set of pixels in the image and the enhancement layer corresponds to another set without filtering.

For example, for the horizontal sampling+side by side arrangement, the left view samples in the base layer correspond to the even samples in the original left view frame, the right view samples in the base layer correspond to the odd samples in the original right view frame, while the left and right view samples in the enhancement layer correspond to the remaining, i.e. odd and even samples, in their original frames respectively.

In this scenario, very high correlation exists between the base and enhancement layers which cannot be exploited as efficiently using the prediction methods provided by MVC.

Similarly to what previously done for the 2D compatible system embodiments, a pre-processing stage (1150) is introduced that processes the base layer information, before utilizing this information as a potential prediction for the enhancement layer.

A further embodiment of the present disclosure provides for a frame compatible 3D architecture similar to the one shown in FIG. 11, with frame compatible signals but without 3D pre-processors (or with 3D-processors operating in a "pass-through mode") and with the presence of data multiplexing at the input (1110), (1130) and data remultiplexing at the output (1170), (1180).

More specifically, apart from filtering and global motion compensation correction that were discussed in the previous section, fixed or adaptive interpolation techniques that account for the characteristics of the sampling and arrangement methods used by the content, can be utilized to process the base layer.

For example, processing could include separable or non-separable interpolation filters, edge adaptive interpolation techniques, filters based on wavelet, bandlet, or ridgelet methods, and inpainting among others.

Other methods that try to enhance resolution or can help with predicting missing frequency information could also be used. Methods that consider information from both views, such as copying the data from the base layer right view to predict the enhancement layer left view, can also be used. Similarly to what discussed above, these methods could be again applied at the sequence, scene, image, or/and region level, while multiple such parameters could be signaled to allow the generation of multiple potential references for prediction. Regions, as in the case of the 2D compatible system, can be predefined or signaled within a bitstream.

It should be noted that it is not necessary for the enhancement layer to utilize the entire or even any part of a prediction/reference picture. In other words, the enhancement layer encoder (1140) can consider the processed images from the base layer for prediction, but only if desired. For example, the user may select to predict the entire enhancement layer from a previously decoded enhancement layer picture, or if multiple pre-processed base layer pictures are available, the encoder can select only one of them (e.g. in view of a rate distortion criterion) or any combination of two reference pictures, assuming the presence of a bi-predictive coding. The same can also occur at the region level.

For example, the entire or part of the top half of a base layer processed image was used to predict the current enhancement layer picture, but instead for the bottom part the encoder selected to use again a previous enhancement layer picture. Additional, block (e.g. for MPEG-2 or MPEG-4 AVC like codecs) or other local motion compensation methods (e.g. a motion compensated method utilized by a future codec) could be used as part of the enhancement layer codec, which may determine that a different prediction, e.g. temporal, may provide better performance.

However, such prediction samples could also be combined together in a bi-predictive or even a multi-hypothesis motion compensated framework again at the block or region level, resulting in further improved prediction.

It should be apparent, similarly to how references are processed in MVC, that each reference in the systems and methods according to the present disclosure could be further interpolated (e.g., using the MPEG-4 AVC/H.264 interpolation filters) and utilized with reference re-ordering and weighted prediction when used for prediction.

Figure 14:
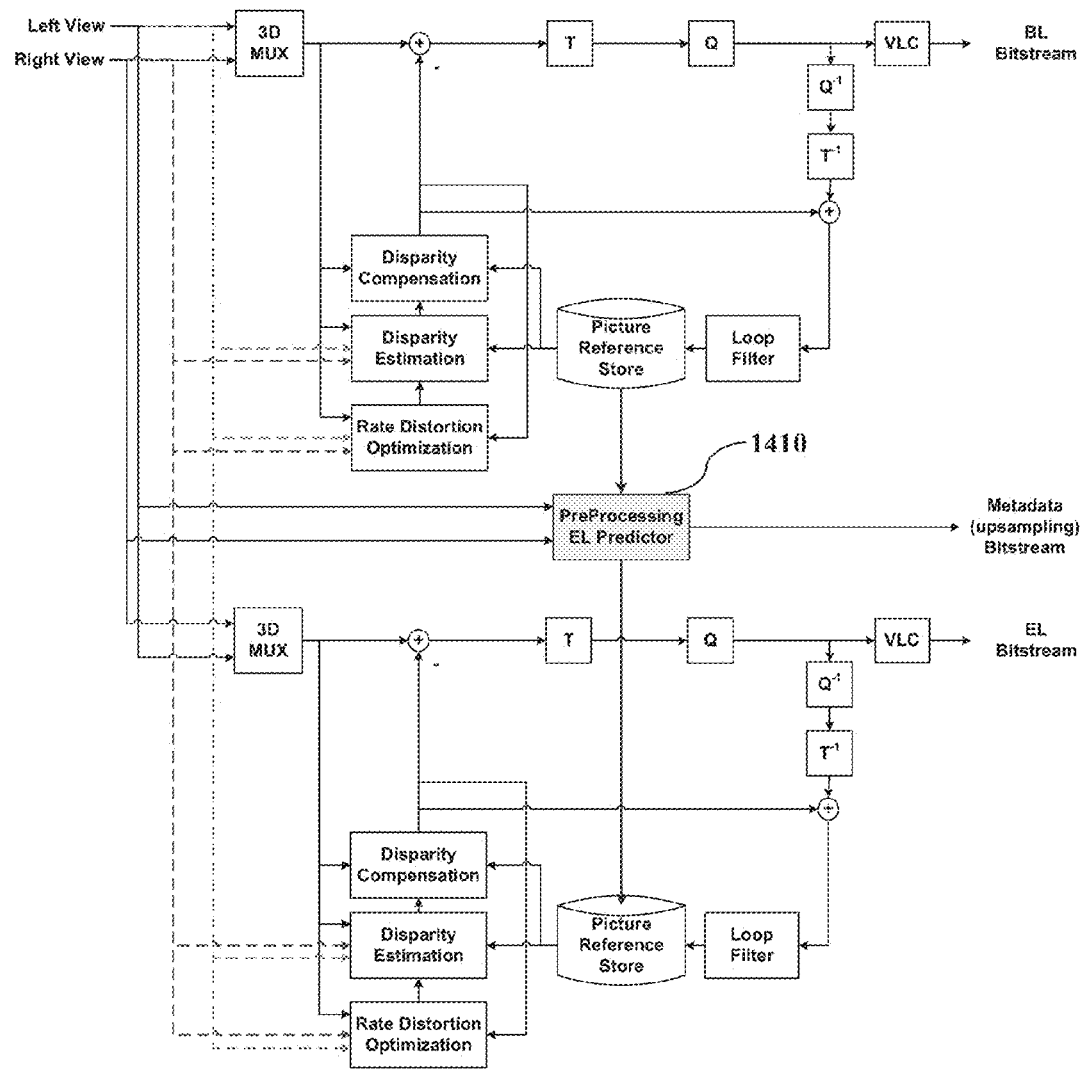
FIG. 14 shows a more detailed diagram of the pre-processing stage of FIG. 11 on the encoder side.
Figure 15:
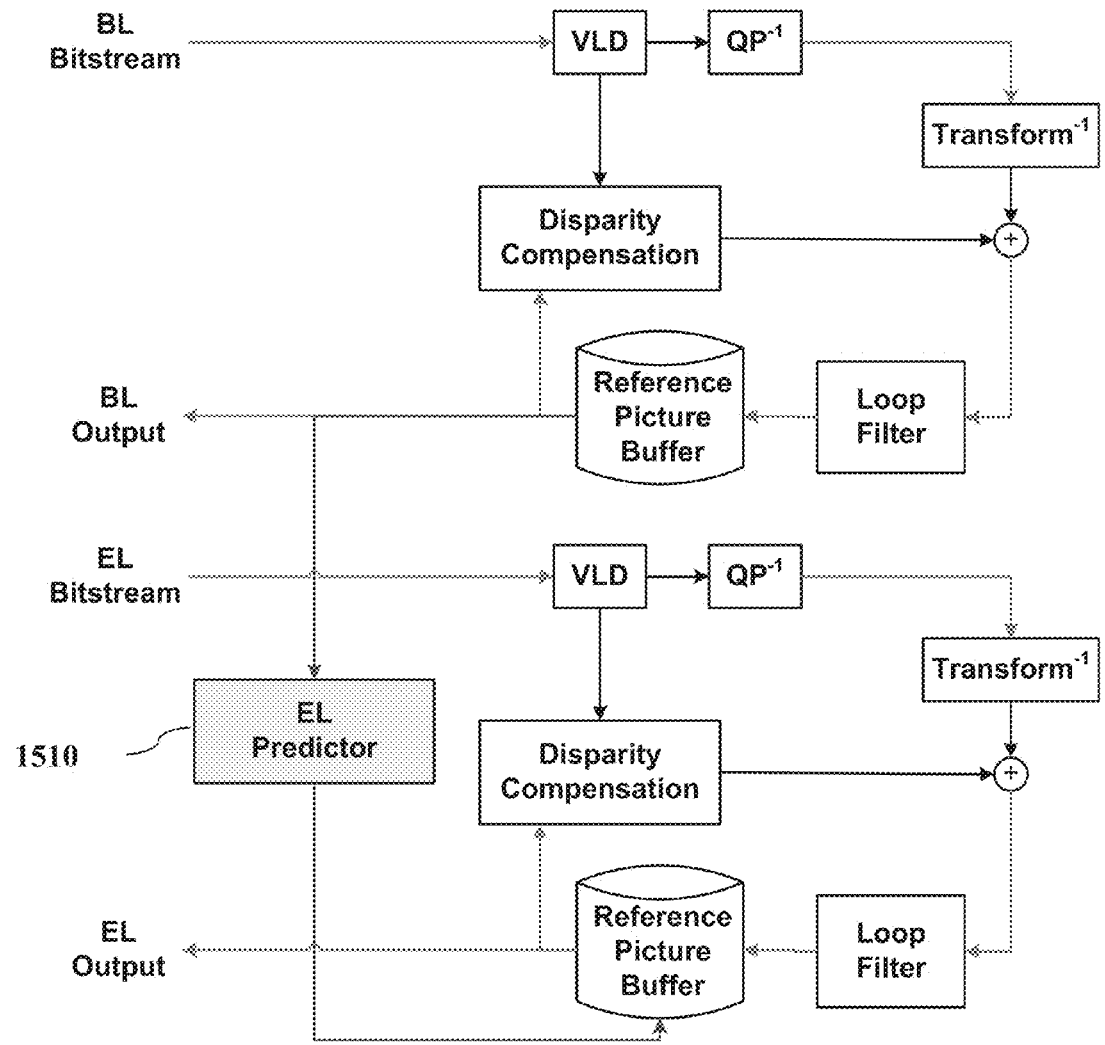
FIG. 15 shows a more detailed diagram of the pre-processing stage of FIG. 11 on the decoder side.

FIG. 14 and FIG. 15 show in detail the pre-processing module (1410) on the encoder side and the pre-processing module (1510) on the decoder side.

Figure 16:
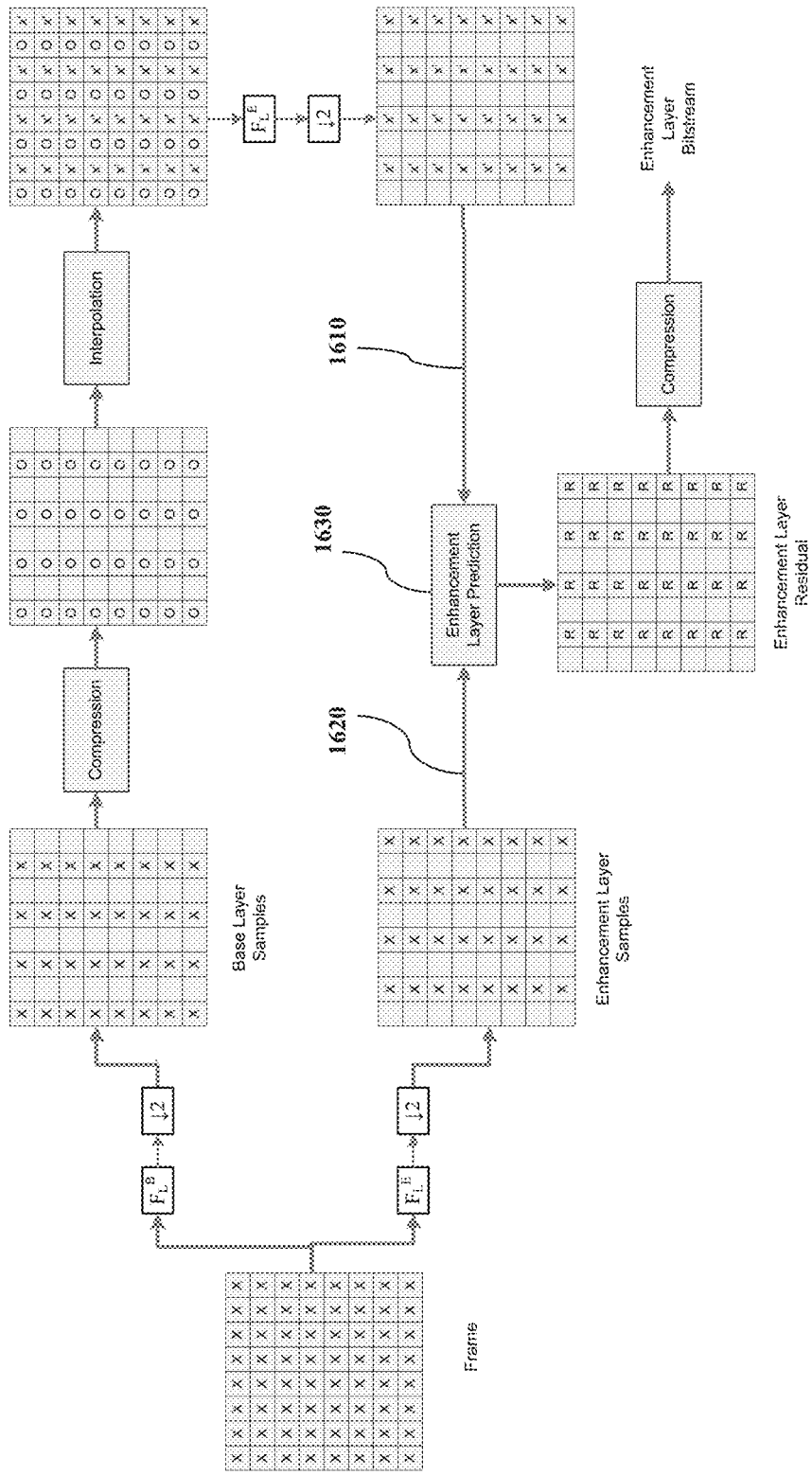
FIG. 16 shows an example of pre-processing technique for a horizontal sampling and side by side packing arrangement.

The design and selection of the pre-processing method can be part of an encoder and can be based on user input or other criteria such as cost, complexity, and coding/quality performance An example of such process is shown in FIG. 16. After a prediction reference from the base layer is created, as stated above, this reference (1610) and all other references (1620) (e.g. previously coded pictures from the enhancement layer or past or differently processed prediction references from the base layer) are considered within a motion compensated architecture to refine the prediction (1630) of the enhancement layer at a lower level, e.g. block or region.

While the process according to the present disclosure is similar to how MPEG-4 AVC/H.264 and its MVC and SVC extensions also perform prediction, better references are used herein in view of the presence of a pre-processing stage. After such prediction is performed, the residual for the enhancement layer can be computed, transformed, quantized and encoded, with any additional overhead such as motion information, using methods similar to those used in the MPEG-4 AVC codec.

Other methods or future codecs can also be utilized to encode such information. This residual can be dequantized, inversed transformed and then added back to the prediction to reconstruct the enhancement layer signal.

According to a further embodiment of the present disclosure, optional in-loop filtering (as shown in FIG. 14 and FIG. 15), such as deblocking, that applies only on the enhancement layer could be used to reduce artifacts, such as blockiness. It should be noted that the enhancement layer in this scenario is in a similar packing arrangement as that of the base layer. For display purposes, the base and enhancement layer data would need to be re-multiplexed together as to generate two separate, full resolution, left and right images. Re-multiplexing could be done by using simple interleaving of the base and enhancement layers. As shown in FIG. 11, re-multiplexing of the base and enhancement layer data occurs through multiplexers (1170) and (1180).

In an alternative embodiment, the base layer information is also filtered prior to combining it, e.g. replacing half of the samples or averaging half of the samples, with the samples from the enhancement layer. Reference can be made to filters $G_L^{B2}$ and $G_L^E$ of FIG. 11, where $G_L^{B2}$ can be averaged with $G_L^E$ in such alternative embodiment.

In a different embodiment, generation of the base layer video could occur through the use of filtering (e.g., to reduce aliasing) prior to decimation. In this scenario, and excluding compression impact, a single layer approach may not be able to generate a true full resolution image. Such single layer can, however, help reconstruction of some of the lost frequencies or accurate reconstruction of half of the resolution of the original signal.

To alleviate for this problem, an additional, 3rd layer can be introduced that tries to correct for any errors introduced by the prior filtering in the base layer. Reference can be made to layer (1160) of FIG. 11. Similar methods could be used for predicting the signal in this new layer from data in both the base and enhancement layers. The person skilled in the art will understand that data from the base layer could be good enough predictors for this new layer without processing or with very little processing.

However, it is possible that the enhancement layer may be of higher quality and could provide additional information that could be also utilized for the prediction of this layer. Therefore, in the present disclosure, apart from prediction references coming from the base layer and previously reconstructed references from this third (second enhancement) layer, references generated using pre-processing of the second (first enhancement) layer, or references using pre-processing while considering both base and first enhancement layer could be used. Therefore, embodiments of the present disclosure can be provided where there is more than one pre-processing stage on the encoding side and more than one pre-processing stage on the decoding side.

In an example, the prediction reference could be generated using edge adaptive interpolation of the enhancement layer while the edge adaptive decisions could be based also on the edges and samples of the base layer. Weighted averaging of an interpolated enhancement layer and the original or filtered base layer could generate a different prediction. Other mechanisms to generate a prediction picture for this enhancement layer could also be used, as discussed above, also including methods employing wavelet interpolation, inpainting and others.

Therefore, according to the teachings of the present disclosure, delivery of 3D content is extended using frame compatible methods, i.e. Checkerboard video delivery, side by side, over-under, etc., to support full resolution through the introduction of additional enhancement layers. These additional enhancement layers can provide apart from additional resolution and/or quality, additional functionalities such as improved streaming and complexity scalability.

The teachings provided in the present disclosure can also be seen as extensions of existing scalable video coding technologies such as the Scalable Video Coding (SVC) and Multiview Video Coding (MVC) extensions of the MPEG-4 AVC standard, however, with the consideration of improved methods for predicting from one layer to the next.

This advantage can result in improvements in coding efficiency, while having similar, and in some cases reduced complexity compared to these technologies. Although some embodiments can be based on the MPEG-4 AVC/H.264 video coding standard, the techniques presented in the present disclosure are codec agnostic and other video coding standards and codecs such as MPEG-2 and VC-1 can be applied to them.

Possible applications of the teachings of the present disclosure are stereoscopic (3D) format video encoders and decoders that can be applied, by way of example and not of limitation, to Blu-ray video discs, broadcast and download/ on demand systems, satellite systems, IPTV systems, and mobile devices that support 3D video.

The methods and systems described in the present disclosure may be implemented in hardware, software, firmware or combination thereof. Features described as blocks, modules or components may be implemented together (e.g., in a logic device such as an integrated logic device) or separately (e.g., as separate connected logic devices). The software portion of the methods of the present disclosure may comprise a computer-readable medium which comprises instructions that, when executed, perform, at least in part, the described methods. The computer-readable medium may comprise, for example, a random access memory (RAM) and/or a read-only memory (ROM). The instructions may be executed by a processor (e.g., a digital signal processor (DSP), an application specific integrated circuit (ASIC), or a field programmable logic array (FPGA)).

The examples set forth above are provided to give those of ordinary skill in the art a complete disclosure and description of how to make and use the embodiments of the encoding and decoding architectures for format compatible 3D video delivery of the disclosure, and are not intended to limit the scope of what the inventors regard as their disclosure. Modifications of the above-described modes for carrying out the disclosure may be used by persons of skill in the video art, and are intended to be within the scope of the following claims. All patents and publications mentioned in the specification may be indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

A number of embodiments of the disclosure have been described. Nevertheless, it will be understood that various modifications may be made without departing from the spirit and scope of the present disclosure. Accordingly, other embodiments are within the scope of the following claims.

What is claimed is:

1. A decoder for decoding a frame compatible three-dimensional (3D) video signal, the decoder comprising:
   an input to receive a coded bitstream comprising encoded images or pictures, each image comprising two views, wherein the two views are interleaved and each view is subsampled according to a quincunx sampling format;
   one or more processors with memory to perform:
      a first decoding function for generating a base layer of reconstructed images based on the coded bitstream;
      a first storage function for storing in a base layer decoding reference buffer the base layer reconstructed images;
      a first pre-processing function for pre-processing the base layer reconstructed images to generate first pre-processed images;
      a second storage function for storing, in a first enhancement layer decoding reference buffer, the first pre-processed images for a first enhancement layer video decoding; and
   a second decoding function for generating a first enhancement layer of reconstructed images based on the coded bitstream and the first pre-processed images,
   wherein the two views are decoded and processed in each of the base layer and the first enhancement layer.

2. The method of claim 1, wherein the one or more processors further decompose the interleaved image into an upconverted first view image and an upconverted second view image.

3. The method of claim 1, wherein the one or more processors further perform:
   a second pre-processing function for pre-processing the first enhancement layer of reconstructed images to generate second pre-processed images;
   a third storage function for storing in a second enhancement layer decoding reference buffer the second pre-processed images for a second enhancement layer video decoding; and
   a third decoding function for generating a second enhancement layer of reconstructed images based on the coded bitstream and the second pre-processed images.

* * * * *